US012798884B2

(12) United States Patent
Miao et al.

(10) Patent No.: US 12,798,884 B2
(45) Date of Patent: Nov. 17, 2026

(54) CONVEYOR DRIVE SYSTEMS

(71) Applicant: INTELLIGRATED HEADQUARTERS, LLC, Mason, OH (US)

(72) Inventors: Yingbin Miao, Charlotte, NC (US); Yusheng Qiu, Charlotte, NC (US); Baichuan Wu, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 92 days.

(21) Appl. No.: 18/737,315

(22) Filed: Jun. 7, 2024

(65) Prior Publication Data

US 2024/0425291 A1 Dec. 26, 2024

(30) Foreign Application Priority Data

Jun. 21, 2023 (CN) ......................... 202310747409.9

(51) Int. Cl.
*B65G 23/12* (2006.01)
*B65G 15/30* (2006.01)
*B65G 23/44* (2006.01)

(52) U.S. Cl.
CPC ............. *B65G 23/12* (2013.01); *B65G 15/30* (2013.01); *B65G 23/44* (2013.01)

(58) Field of Classification Search
CPC .... B65G 15/60; B65G 17/02; B65G 2201/02; B65G 2201/04; B65G 23/14; B65G 65/42;

(Continued)

(56) References Cited

U.S. PATENT DOCUMENTS 10,577,193 B1 * 3/2020 Erceg .................. B65G 47/962
2002/0134651 A1 9/2002 Itoh (Continued)

FOREIGN PATENT DOCUMENTS

CN 210854067 U * 6/2020
CN 211756909 U 10/2020

(Continued)

OTHER PUBLICATIONS

Dorner, Screenshot of Dorner website entailing the size options for their small conveyors., Feb. 23, 2021, https://www.domerconveyors.com/small-conveyors (Year: 2021).*

(Continued)

*Primary Examiner* — Gene O Crawford
*Assistant Examiner* — Amari J Meddling
(74) *Attorney, Agent, or Firm* — Alston & Bird LLP

(57) ABSTRACT

Drive systems and/or the like are provided. In some embodiments, a drive system may include a frame; a conveyor configured to wrap around the frame and to rotate relative to the frame, wherein the conveyor defines an effective surface area configured to support and transport one or more objects; one or more rollers configured to drive the conveyor around the frame; a timing belt disposed beneath the frame and configured to support the conveyor as the conveyor rotates relative to the frame; a motor disposed beneath the frame, wherein the timing belt is operably engaged with the motor, and wherein the motor is configured to drive the one or more rollers and the timing belt such that an angular velocity of the conveyor and an angular velocity of the timing belt are equal.

11 Claims, 6 Drawing Sheets

(58) Field of Classification Search
CPC ...... B65G 15/30; B65G 17/345; B65G 21/06; B65G 23/12; B65G 23/44; B65G 43/08; B65G 47/96; B65G 47/962
See application file for complete search history.

(56) References Cited

U.S. PATENT DOCUMENTS

| | | | |
|---|---|---|---|
| 2009/0277693 | A1 | 11/2009 | Verhaar |
| 2009/0287346 | A1 | 11/2009 | Hirsch et al. |

FOREIGN PATENT DOCUMENTS

| | | | |
|---|---|---|---|
| CN | 212424461 | U | 1/2021 |
| DE | 65221 | A1 | 1/1968 |
| DE | 102005047779 | A1 | 4/2007 |
| EP | 0128378 | A1 | 12/1984 |
| EP | 1710176 | A2 | 10/2006 |

OTHER PUBLICATIONS

Extended European Search Report Mailed on Sep. 26, 2024 for EP Application No. 24176271, 8 page(s).

* cited by examiner

CONVEYOR DRIVE SYSTEMS

CROSS-REFERENCE TO RELATED APPLICATIONS

This application claims priority pursuant to 35 U.S.C. 119 (a) to Chinese Application No. 202310747409.9, filed Jun. 21, 2023, which application is incorporated herein by reference in its entirety.

TECHNICAL FIELD

The present disclosure relates generally to drive systems. In particular, it relates to motor drive systems for use in conveyors.

BACKGROUND

Conveyors (e.g., cross-belts) may be powered in one of several ways, including via an E-roller drive mode or a motor drive mode. With an E-roller drive mode, a conveyor system may achieve a greater effective belt surface (approaching full belt), but may also have low efficiency while running and require large power consumption in some cases. With a motor drive mode, the electrical efficiency may be improved, but the effective belt surface may also be reduced, in some cases significantly.

Through applied effort, ingenuity, and innovation, Applicant has solved problems relating to drive systems for conveyors by developing solutions embodied in the present disclosure, which are described in detail below.

SUMMARY

In general, embodiments of the present disclosure provide drive systems and/or the like.

In accordance with various embodiments of the present disclosure there is provided a drive system including: a frame; a conveyor configured to wrap around the frame and to rotate relative to the frame, wherein the conveyor defines an effective surface area configured to support and transport one or more objects; one or more rollers configured to drive the conveyor around the frame; a timing belt disposed beneath the frame and configured to support the conveyor as the conveyor rotates relative to the frame; a motor disposed beneath the frame, wherein the timing belt is operably engaged with the motor, and wherein the motor is configured to drive the one or more rollers and the timing belt such that an angular velocity of the conveyor and an angular velocity of the timing belt are equal.

In some embodiments, the effective surface area of the conveyor ranges between 0.4 and 0.6 square meters.

In some embodiments, the conveyor is a cross-belt conveyor.

In some embodiments, the drive system further includes one or more internal rollers disposed beneath the frame, wherein one of the one or more internal rollers is coupled to the motor, and wherein the one or more internal rollers are configured to create tension in the conveyor or the timing belt.

In some embodiments, the frame further includes one or more panels configured to cover one or more of the timing belt, the motor, and the one or more internal rollers.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

According to various embodiments, a drive system may have a frame around which a conveyor has been wrapped and is configured to support and one or more objects in a warehouse, distribution center, or similar industrial space. In some embodiments, the drive system may include a motor configured to drive the conveyor so that the conveyor may transport the one or more objects. In some embodiments, the motor may drive the conveyor by powering one or more rollers that are coupled to the conveyor. In some embodiments, the motor may be located within the drive system such that an external motor is not necessary to drive the conveyor.

In some embodiments, the drive system may include a timing belt located beneath the conveyor. In some embodiments, the motor may drive the timing belt along with the conveyor. In some embodiments, the timing belt may match the angular velocity of the conveyor such that the conveyor and timing belt overlap without friction between the two. In some embodiments, the internal motor may increase the efficiency of the conveyor in transporting one or more objects.

Example Drive Systems

Figure 1:
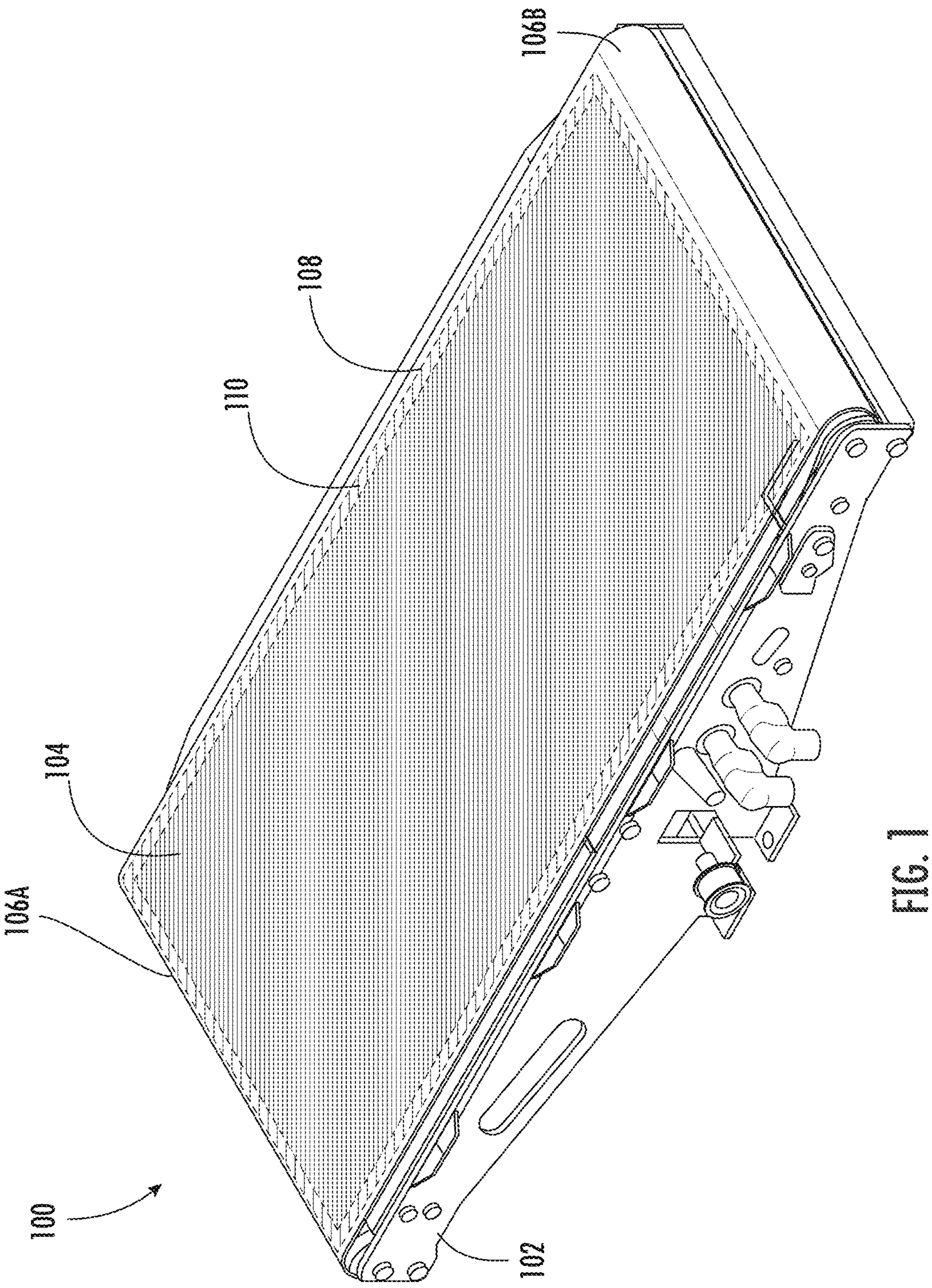
FIG. 1 is a top angled view of an example drive system in accordance with various embodiments of the present disclosure.

FIG. 1 is a top angled view of an example drive system 100, in accordance with various embodiments of the present disclosure. In some embodiments, the drive system 100 may include a frame 102. In some embodiments, the frame 102 may a rigid, structure substantially composed of metal, plastic, or some other "hard" material. In some embodiments, the frame may include one or more slots or protrusions. In some embodiments, one or more components or auxiliary devices may be attached to the frame 102 via the one or more slots/protrusions. In some embodiments, the frame 102 may define one or more sidewalls, which may be substantially triangular in shape.

In some embodiments, the drive system 100 may include a conveyor 104. In some embodiments, the conveyor 104 may be wrapped around and configured to circulate around and through the frame 102. A top angle view of the conveyor 104 is shown in at least FIG. 2C, according to various embodiments. In some embodiments, the conveyor 104 may be a conveyor as generally understood and utilized in conveying and similar systems.

In some embodiments, the drive system 100 may include one or more active rollers 106A and 106B. In some embodiments, the one or more active rollers 106A and 106B may be configured to drive the conveyor 104 of the drive system 100. In some embodiments, the active rollers 106A and 106B may be powered by a motor 112, as shown in at least FIG. 2A. In some embodiments, one of the rollers 106A, 106B may be a passive roller.

In some embodiments, and as shown in at least FIG. 1, an example drive system may have a conveyor surface area 108 and an effective area 110. In some embodiments, the effective area 110 may be the surface area of the conveyor 104 that is configured to move one or more objects along the conveyor, with objects outside of the effective area 110 not being substantially moved. In some embodiments, the effective area 110 may range between 0.4 and 0.6 square meters. In some embodiments, the effective area 110 may be approximately 423,700 square millimeters.

Figure 2A:
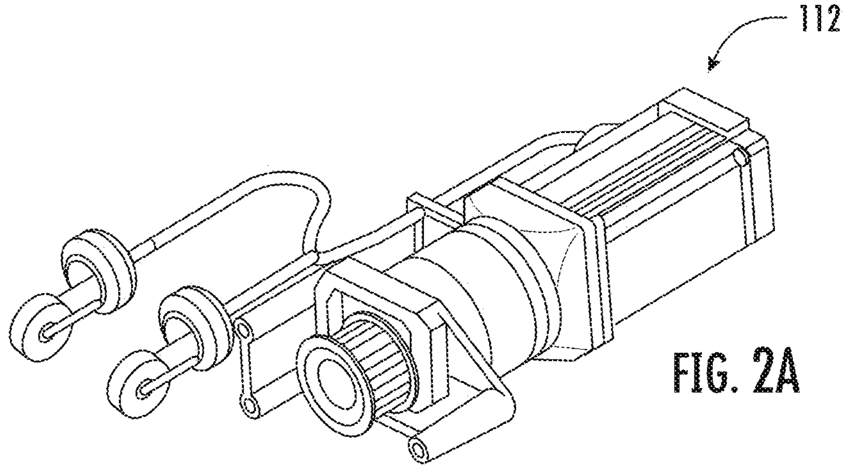
FIG. 2A is a top angled view of an example motor in accordance with various embodiments of the present disclosure.

In some embodiments, and as shown in at least FIG. 2A, the drive system 100 may include an example motor 112 in accordance with various embodiments of the present disclosure. In some embodiments, the motor 112 may be installed within the drive system 100 (e.g., below the frame 102). In some embodiments, the motor may drive/actuate one or more components of the drive system 100. In some embodiments, the motor 112 may be an AC motor, a gear motor, or a brushless DC motor.

Figure 2B:
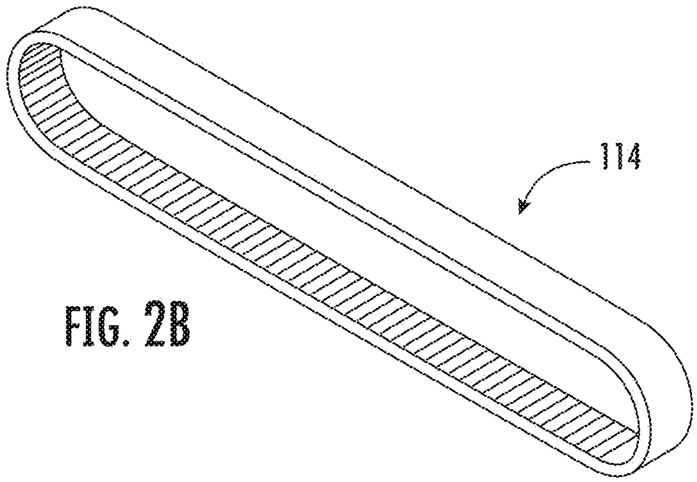
FIG. 2B is a top angled view of an example timing belt in accordance with various embodiments of the present disclosure.
Figure 2C:
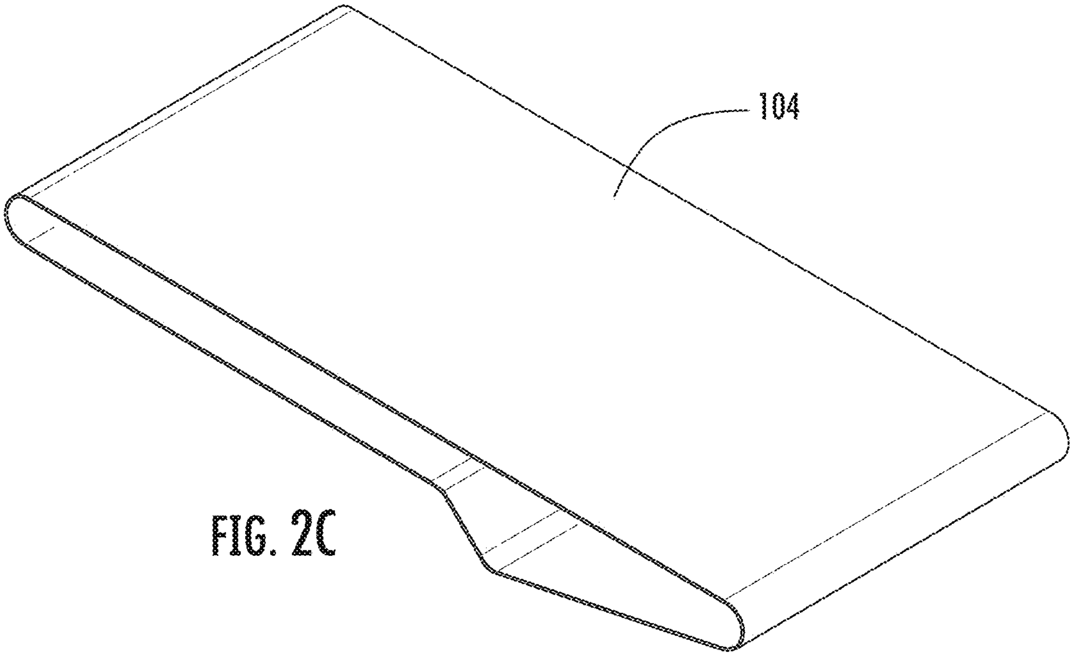
FIG. 2C is a top angled view of an example conveyor belt in accordance with various embodiments of the present disclosure.

In some embodiments, and as shown in at least FIG. 2B, the drive system 100 may include a timing belt 114 in accordance with various embodiments of the present disclosure. In some embodiments, the timing belt 114 may be a timing belt as generally understood and utilized in conveyors and similar systems. In some embodiments, the timing belt 114 may include one or more teeth and may be configured to support motion of the conveyor around the frame 102. In some embodiments, the timing belt 114 may be positioned beneath the conveyor 104. In some embodiments, the timing belt 114 may be configured to be driven in combination with the conveyor; that is, the speed of the conveyor 104 may be configured to be set in synchronization with the timing belt 114. In some embodiments, the timing belt 114 may rotate with an angular velocity matching that of the angular velocity of the conveyor 104. In some embodiments, the timing belt 114 may be positioned and configured to run relative to the conveyor 104 such that there is no or minimal friction between the timing belt 114 and the conveyor 104.

Figure 3A:
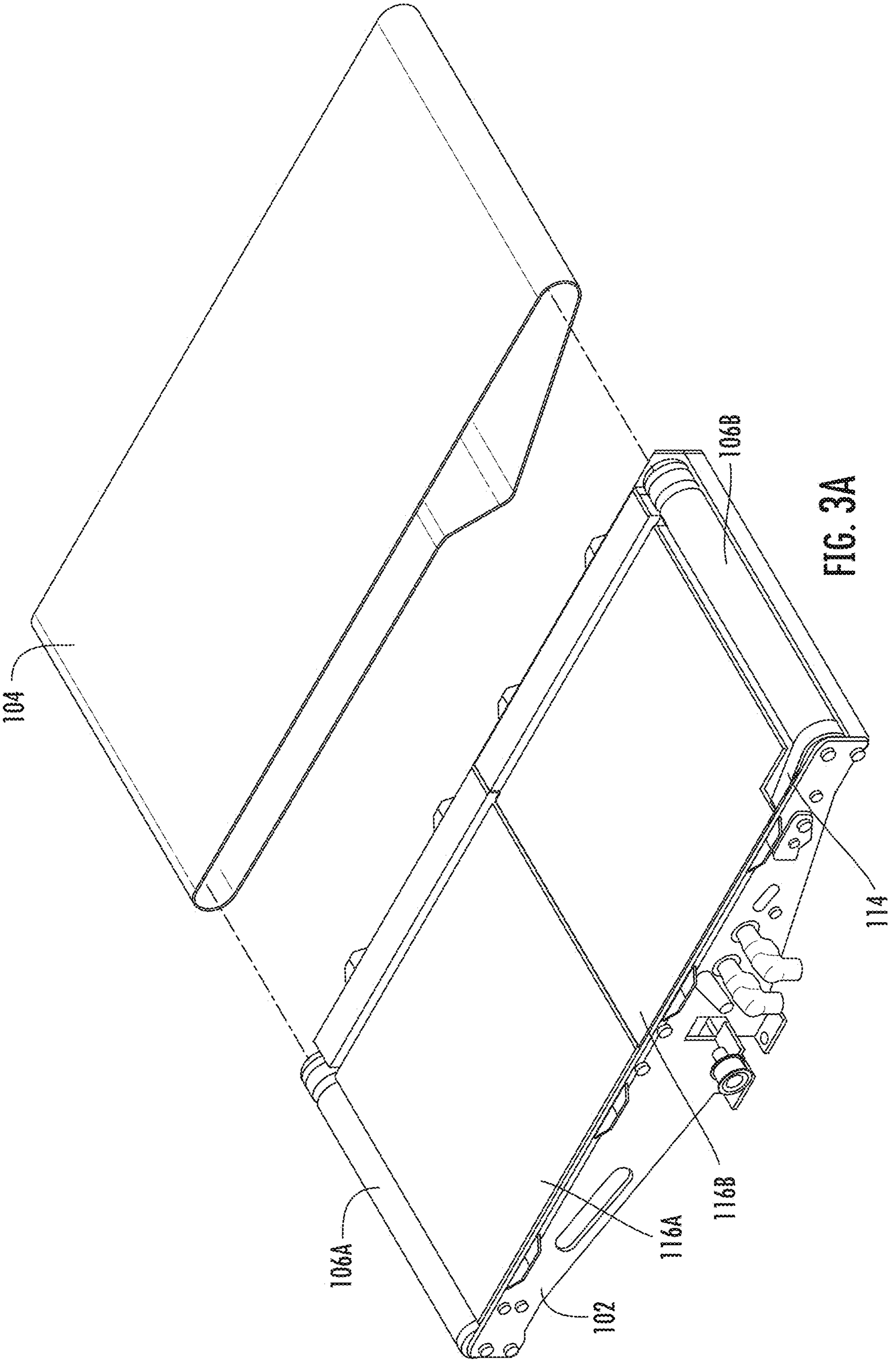
FIG. 3A is a top angled exploded view of an example drive system in accordance with various embodiments of the present disclosure.
Figure 3B:
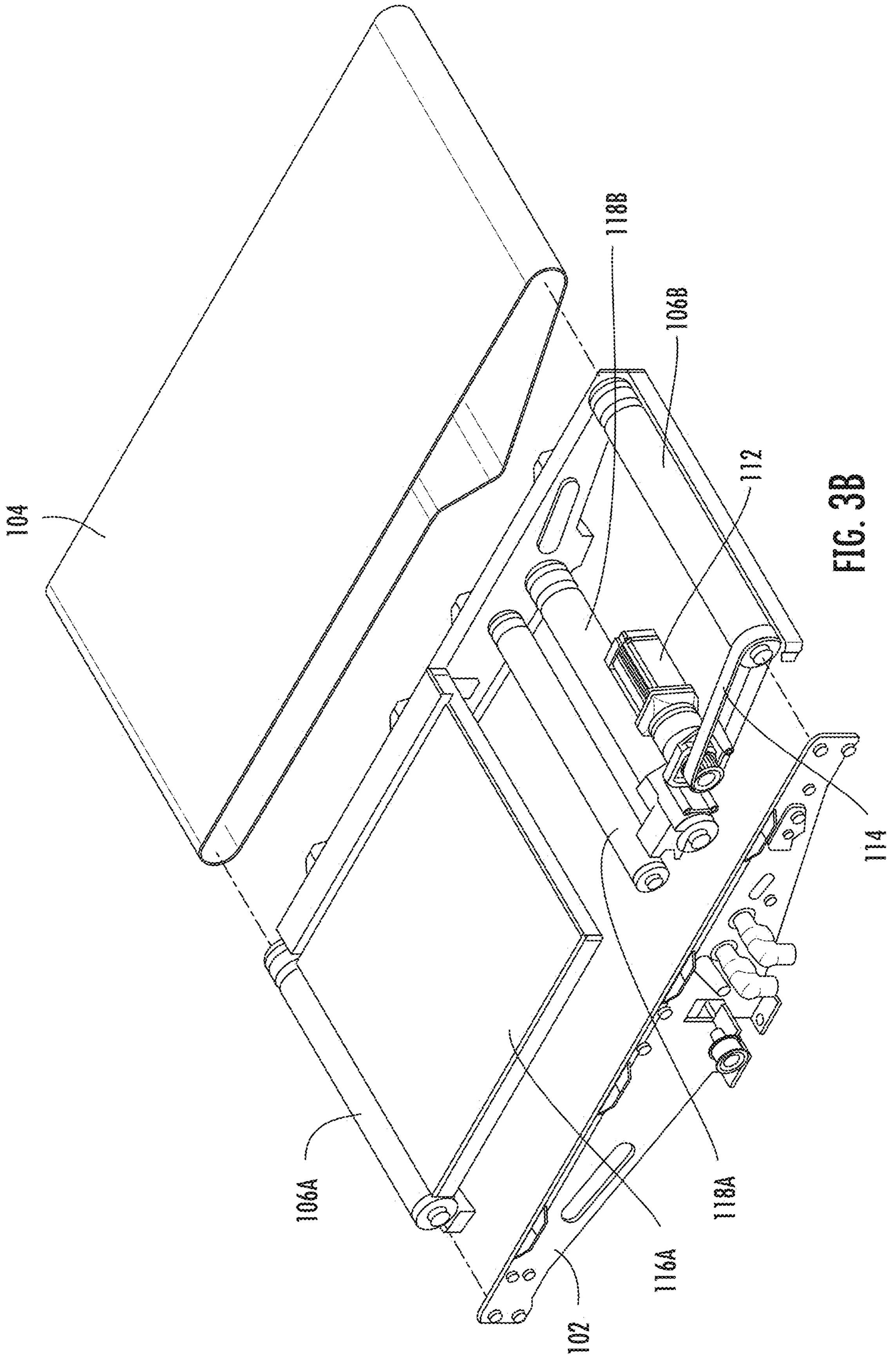
FIG. 3B is a top angled internal view of an example drive system in accordance with various embodiments of the present disclosure.
Figure 3C:
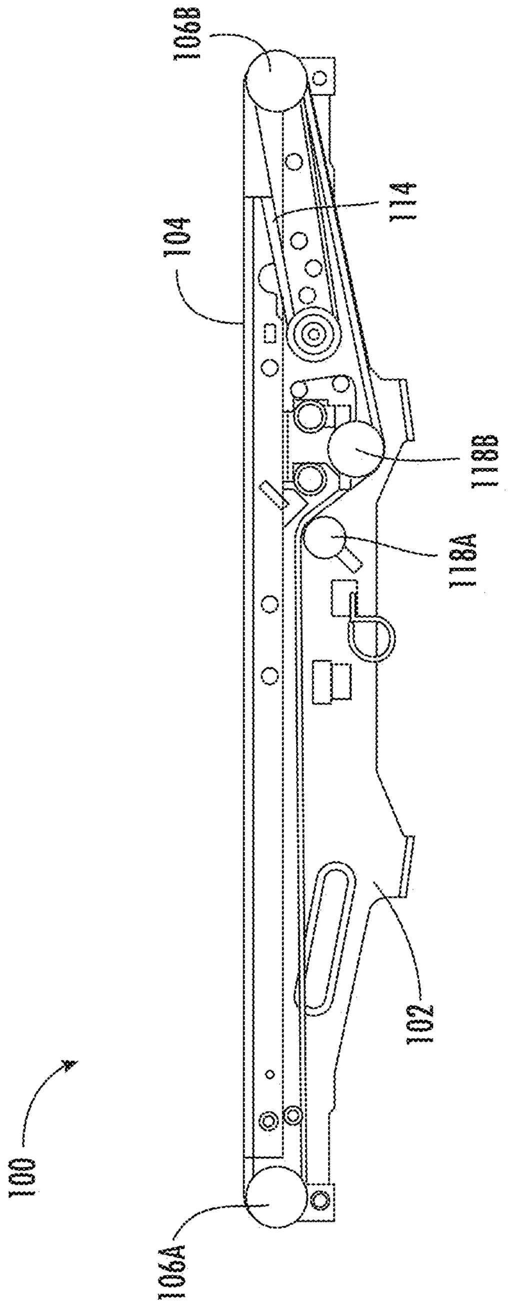
FIG. 3C is an elevation side view of an example drive system in accordance with various embodiments of the present disclosure.

FIG. 3A shows a top angled exploded view of an example drive system 100, and FIG. 3B shows a similarly-angled view to FIG. 3B, but includes a detailed view of internal components of the drive system 100. FIG. 3C shows an elevation side view of the example drive system 100 in accordance with various embodiments of the present disclosure.

As shown in at least FIG. 3A, in some embodiments, the conveyor 104 may be placed over one or more panels 116A, 116B. In some embodiments, the panels 116A, 116B may be disposed on opposite sides of the frame 104 of the drive system 100. In some embodiments, the panels 116A, 116B may, with the frame 104, protect one or more internal components of the drive system 100, including (but not limited to) the motor 112.

As shown in at least FIG. 3B, in some embodiments, one or more internal rollers 118A, 118B may be housed within the drive system 100. In some embodiments, the one or more internal rollers 118A, 118B may be configured to further drive the conveyor 104 and/or the timing belt 114. In some embodiments, one of the one or more internal rollers 118A, 118B may be directly connected to the motor 112. In some embodiments, one of the one or more internal rollers 118A, 118B may create tension in the conveyor 104 and/or the timing belt 114. Although two internal rollers 118A, 118B are shown in the various figures, it will be understood that more or fewer internal rollers 118A, 118B may be utilized, as desired, to further increase the effective area 110 of the conveyor 104. It will also be understood that the internal rollers 118A, 118B are shown in FIG. 3C for the purpose of representation and are not visible on the exterior of the drive system 100 as shown in FIG. 3C.

Figure 3D:
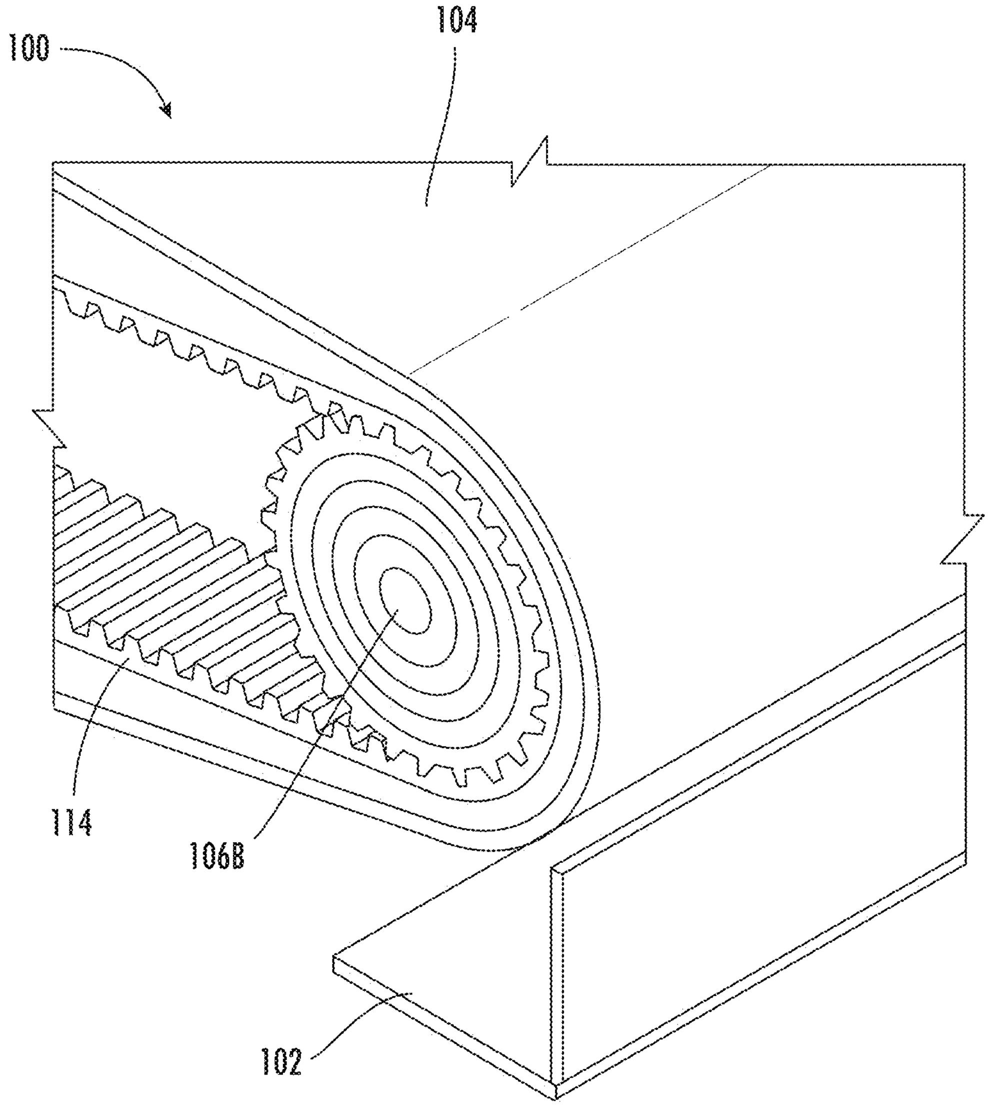
FIG. 3D is a detail view of an example drive system in accordance with various embodiments of the present disclosure.

The rotation of the timing belt 114 can be seen in greater detail in FIG. 3D. As shown, according to some embodiments, the timing belt 114 may rotate in the direction designated by the arrow (i.e., clockwise). In some embodiments, the conveyor 104 may rotate in the same direction of the arrow and at the same or nearly the same angular velocity as the timing belt 114.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A drive system comprising:

a frame;

a conveyor configured to wrap around the frame and to rotate relative to the frame, wherein the conveyor defines an effective surface area configured to support and transport one or more objects;

one or more rollers configured to drive the conveyor around the frame;

a timing belt disposed beneath the frame and configured to support the conveyor as the conveyor rotates relative to the frame, wherein the timing belt is positioned beneath the conveyor;

a motor disposed beneath the frame, wherein the timing belt is operably engaged with the motor, and wherein the motor is configured to drive the one or more rollers and the timing belt; and one or more internal rollers disposed beneath the frame, wherein the one or more internal rollers are configured to create tension in the conveyor or the timing belt, and wherein the frame further comprises one or more panels configured to cover the one or more internal rollers.

2. The drive system of claim 1, wherein the effective surface area of the conveyor ranges between 0.4 and 0.6 square meters.

3. The drive system of claim 1, wherein the conveyor is a cross-belt conveyor.

4. The drive system of claim 1, wherein one of the one or more internal rollers is coupled to the motor.

5. The drive system of claim 4, wherein the one or more panels are further configured to cover one or more of the timing belt and the motor.

6. The drive system of claim 1, wherein one of the one or more rollers is an active roller configured to drive the conveyor around the frame.

7. The drive system of claim 1, wherein one of the one or more rollers is a passive roller.

8. The drive system of claim 1, wherein the one or more internal rollers are housed within the drive system.

9. The drive system of claim 1, wherein the one or more panels comprise two panels disposed on opposite sides of the frame.

10. The drive system of claim 1, wherein the conveyor is positioned over the one or more panels.

11. The drive system of claim 1, wherein the frame comprises sidewalls, wherein the frame is substantially triangular in shape.

* * * * *